(12) United States Patent
Parnell

(10) Patent No.: US 9,643,636 B2
(45) Date of Patent: May 9, 2017

(54) APPARATUS FOR SECURING A WALKING ASSIST DEVICE

(71) Applicant: John E. Parnell, Easley, SC (US)

(72) Inventor: John E. Parnell, Easley, SC (US)

(73) Assignee: P.U.F. LLC, Pickens, NC (US)

( * ) Notice: Subject to any disclaimer, the term of this patent is extended or adjusted under 35 U.S.C. 154(b) by 0 days.

(21) Appl. No.: 14/266,212

(22) Filed: Apr. 30, 2014

(65) Prior Publication Data

US 2014/0326843 A1 Nov. 6, 2014

Related U.S. Application Data

(60) Provisional application No. 61/818,350, filed on May 1, 2013.

(51) Int. Cl.
*B62B 3/10* (2006.01)
*B62B 5/00* (2006.01)
*A61H 3/02* (2006.01)
*B62B 3/14* (2006.01)
*A61H 3/04* (2006.01)

(52) U.S. Cl.
CPC .............. *B62B 5/00* (2013.01); *A61H 3/0244* (2013.01); *B62B 3/102* (2013.01); *B62B 3/146* (2013.01); *B62B 3/1472* (2013.01); *A61H 3/04* (2013.01); *A61H 2003/0255* (2013.01); *Y10T 29/49947* (2015.01)

(58) Field of Classification Search
CPC ... A47J 45/02; A47J 45/10; A47F 5/00; A47F 5/08; A47F 5/13; A47F 7/00; A63B 55/00
USPC ....... 248/316.7, 316.6, 316.1, 230.7, 229.26, 248/229.16, 214, 62, 65, 68.1, 72, 73, 248/74.2, 74.3, 74.4, 67.7
See application file for complete search history.

(56) References Cited

U.S. PATENT DOCUMENTS

| | | | | |
|---|---|---|---|---|
| 420,592 | A | * | 2/1890 | Dayton .................. 248/514 |
| 1,452,993 | A | * | 4/1923 | Wack ................... 248/74.4 |
| 1,491,286 | A | * | 4/1924 | Calhoun ................. 211/32 |
| 1,530,180 | A | * | 3/1925 | Holmes ................. 211/65 |
| 1,627,575 | A | * | 5/1927 | Rovelli ................. 248/37.6 |
| 1,752,522 | A | * | 4/1930 | Eckelman ............... 248/37.6 |
| 1,895,656 | A | * | 1/1933 | Gadke ................. 248/229.26 |
| 2,127,234 | A | * | 8/1938 | Reiter .................. 24/703.3 |
| 2,523,785 | A | * | 9/1950 | Sereno ................. 403/188 |
| 3,003,736 | A | * | 10/1961 | Hofgesang .............. 248/229.26 |
| 3,905,070 | A | * | 9/1975 | Macrae ................. 403/191 |
| 4,388,967 | A | * | 6/1983 | Breese ................. 165/80.3 |
| 4,714,221 | A | * | 12/1987 | Cawrey ................. 248/220.42 |
| 4,852,838 | A | * | 8/1989 | Field .................. 248/222.13 |

(Continued)

*Primary Examiner* — Nkeisha Smith
(74) *Attorney, Agent, or Firm* — Trego, Hines & Ladenheim, PLLC; Brandon Trego; Jonathan Hines

(57) ABSTRACT

An apparatus for securing a user's accessory or walking assist device is disclosed. The apparatus includes a base and at least one hook extending outwardly from a rear surface of the base and adapted to secure the apparatus to a support. The apparatus further includes a first gripping arm extending outwardly from a first side of the base and protruding forward of a front surface of the base and a second gripping arm extending outwardly from a second side of the base and protruding forward of the front surface of the base. The first and second gripping arms form a holding space therebetween to secure an accessory therein, thereby securing the accessory to the support 14.

7 Claims, 4 Drawing Sheets

(56) References Cited

U.S. PATENT DOCUMENTS

| | | | | |
|---|---|---|---|---|
| 4,998,277 | A * | 3/1991 | Rioux, Jr. | 379/454 |
| 5,332,090 | A * | 7/1994 | Tucker | 206/315.3 |
| 5,351,920 | A * | 10/1994 | Decky et al. | 248/73 |
| 5,408,796 | A * | 4/1995 | Hashimoto | E04B 2/7409 52/481.2 |
| 5,697,591 | A * | 12/1997 | Cooper | 248/229.16 |
| 5,743,414 | A * | 4/1998 | Baudino | 211/69.1 |
| 5,823,483 | A * | 10/1998 | Gaskill | 248/37.6 |
| 6,273,279 | B1 * | 8/2001 | Wolf | 211/86.01 |
| 6,497,395 | B1 * | 12/2002 | Croker | 248/300 |
| 6,513,772 | B2 * | 2/2003 | Gary et al. | 248/231.91 |
| 6,592,082 | B1 * | 7/2003 | Fear | H02G 3/0456 248/68.1 |
| 6,644,892 | B2 * | 11/2003 | Nishiwaki et al. | 405/184.4 |
| 7,131,170 | B2 * | 11/2006 | Weaver | 24/545 |
| 7,533,854 | B2 * | 5/2009 | Aube | 248/95 |
| 7,854,420 | B2 * | 12/2010 | Depay et al. | 248/316.7 |
| 8,662,455 | B2 * | 3/2014 | Hernandez et al. | 248/73 |
| 8,960,616 | B2 * | 2/2015 | Gibbons et al. | 248/201 |
| 2002/0130237 | A1 * | 9/2002 | Kluser | 248/316.1 |
| 2004/0200938 | A1 * | 10/2004 | Forlivio | 248/213.2 |
| 2004/0211871 | A1 * | 10/2004 | Turvey et al. | 248/316.1 |
| 2008/0179474 | A1 * | 7/2008 | Johnson | 248/214 |
| 2013/0170823 | A1 * | 7/2013 | McDonald et al. | 396/428 |
| 2014/0117172 | A1 * | 5/2014 | Ellis | 248/73 |

\* cited by examiner

APPARATUS FOR SECURING A WALKING ASSIST DEVICE

BACKGROUND OF THE INVENTION

The present invention relates to an apparatus for holding accessories and, more particularly, to an apparatus for securing a user's walking assist device, such as canes.

Walking assist devices are regularly used by individuals who need additional support when walking. These individuals may be older and simply need something to help steady them, injured, or have a handicap that requires the support of the assist device. While walking assist devices provide support to a user, they are cumbersome and can often get in the way when performing a task, such as grocery shopping.

Currently, there exists no convenient way to store a cane or other walking assist device safely on a common grocery cart. Many users of such items need to resort to putting the device into the cart, in which case the device protrudes at an angle, or falls through the bottom of the cart basket vertically. Also, with motorized riding carts, the user has no choice but to prop the device in their lap sideways, which is an injury risk to other pedestrians as well as themselves. Laying the device across the top of said carts is also a risk for the operator and pedestrians.

Accordingly, there is a need for a safe, effective solution to store a cane or similar walking assisting device securely to a common grocery cart or motorized carts of the same purpose.

BRIEF SUMMARY OF THE INVENTION

These and other shortcomings of the prior art are addressed by the present invention, which provides an apparatus adapted to enable users of a walking cane or other device to effectively and securely store the cane temporarily onto a variety of grocery carts or other wire-mesh carts such as the wire basket area used in motorized assisted grocery carts.

According to one aspect of the invention, an apparatus adapted to secure an accessory therein includes a base and at least one hook extending outwardly from a rear surface of the base and adapted to secure the apparatus to a support. The apparatus further includes a first gripping arm extending outwardly from a first side of the base and protruding forward of a front surface of the base and a second gripping arm extending outwardly from a second side of the base and protruding forward of the front surface of the base. The first and second gripping arms form a holding space therebetween to secure an accessory therein, thereby securing the accessory to the support.

According to another aspect of the invention, a method of securing an accessory to a support includes the steps of providing a first apparatus having first and second gripping arms adapted to secure an accessory therebetween and at least one hook for securing the first apparatus to a first support. The method further including the steps of positioning the first apparatus on the first support and using the at least one hook to secure the first apparatus thereto, positioning the accessory between the first and second gripping arms, and pushing the accessory into a holding space created between the first and second gripping arms.

According to another aspect of the invention, a method of securing an accessory to a support includes the steps of providing a first apparatus having first and second gripping arms adapted to secure an accessory therebetween and at least one hook for securing the first apparatus to a first support. The method further includes the steps of securing the first apparatus to the accessory and using the at least one hook to secure the first apparatus and accessory to the first support.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
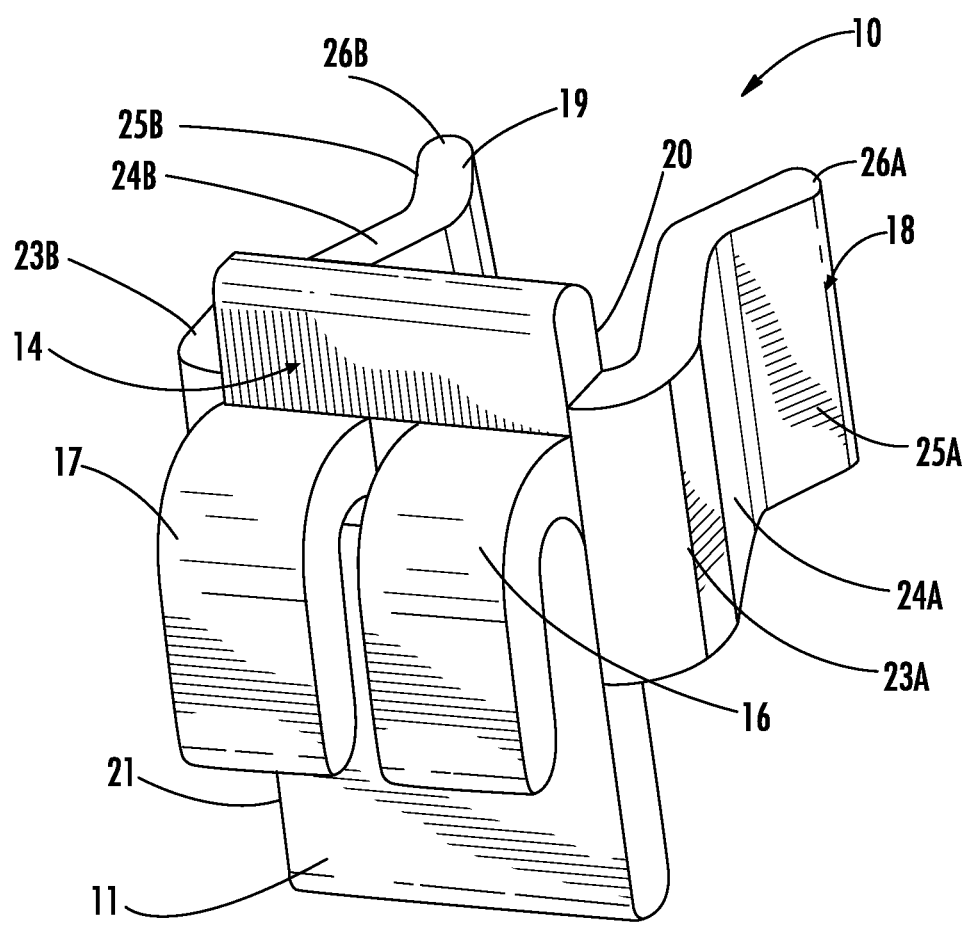
FIG. 1 is a perspective view of an apparatus in accordance with an embodiment of the invention.
Figure 2:
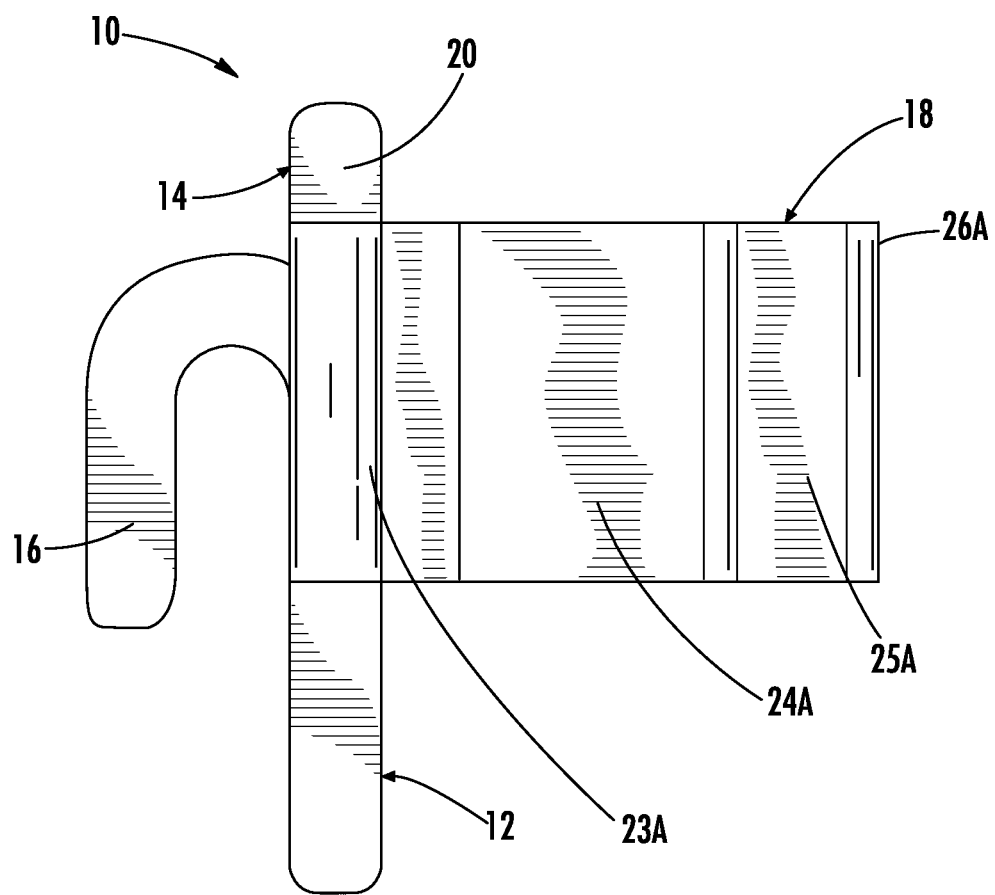
FIG. 2 is a side elevation of the apparatus of FIG. 1.
Figure 3:
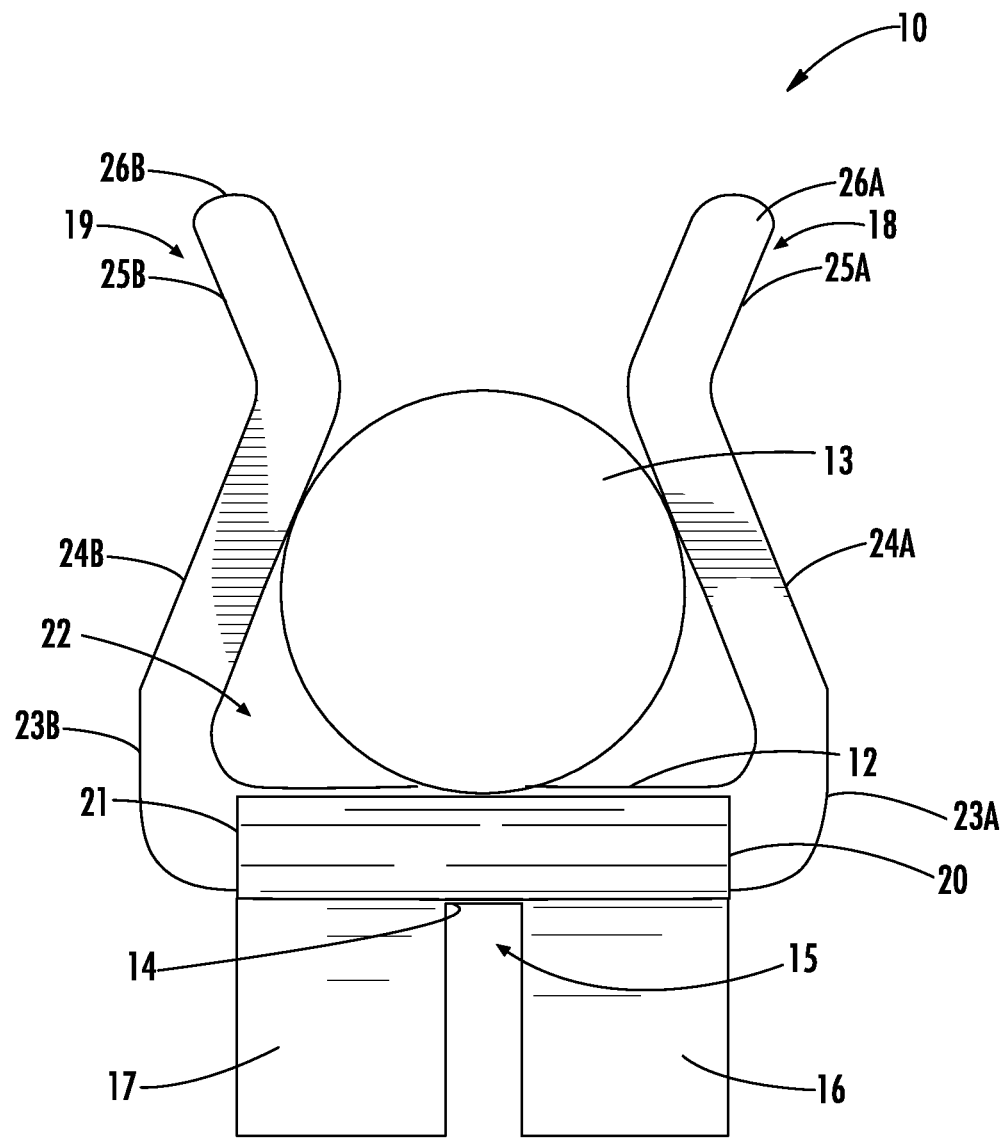
FIG. 3 is a top view of the apparatus of FIG. 1.

Referring to the drawings, an exemplary apparatus for securing a walking assist device according to the present invention is illustrated in FIGS. 1-3 and shown generally at reference numeral 10. The apparatus 10 includes a base 11 having a front surface 12 adapted to rest against a walking assist device 13 and a rear surface 14 adapted to rest against a support such as a mesh support 30 of a grocery cart (See FIG. 4). It should be appreciated that the apparatus 10 may be made of any suitable material for supporting and holding a walking assist device.

First and second hooks 16 and 17 extend outwardly from the rear surface 14 of the base 11 to allow the apparatus 10 to be secured to a support. As shown, the hooks 16 and 17 are spaced-apart by channel 15 to allow a non-support member of a wire mesh to slide between the hooks 16 and 17 as the hooks 16 and 17 are secured over a support member of the wire mesh.

First and second parallel gripping arms 18 and 19 extend outwardly from first and second opposing sides 20 and 21 of the base 11, respectively, and forward of the front surface 12 to create a holding space 22 therebetween. As illustrated, arm 18 extends outwardly and forward from side 20 and arm 19 extends outwardly and forward from side 21.

As illustrated, arm 18 includes a first section 23A which extends from side 20, a second section 24A extending outwardly from the first section 23A, and a third section 25A extending outwardly from the second section 24A. Arm 19 includes the same sections 23B-25B.

The first 23A, 23B and second 24A, 24B sections cooperate to form the holding space 22. As shown, the holding space 22 has a trapezoidal shape with the widest portion of the space 22 occurring at the front surface 12 and the smallest portion occurring between ends of the second sections 24A, 24B; however, any other suitable shape may be formed. The third sections 25A, 25B are angled outwardly from the second sections 24A, 24B to create a space therebetween that is at its widest point between the distal ends 26A and 26B of the third sections 25A and 25B to enable a walking assist device 13 to be pushed between the arms 18 and 19 and into the holding space 22.

The arms 18 and 19 are made of a flexible yet resilient material to permit the arms 18 and 19 to expand when the walking assist device 13 is being positioned between the arms 18 and 19 and then retract to a holding position once the device 13 has been positioned in the holding space 22, thereby securing the device 13 therein. The apparatus 10 allows devices 13 of varying sizes to be secured in the holding space 22.

Figure 4:
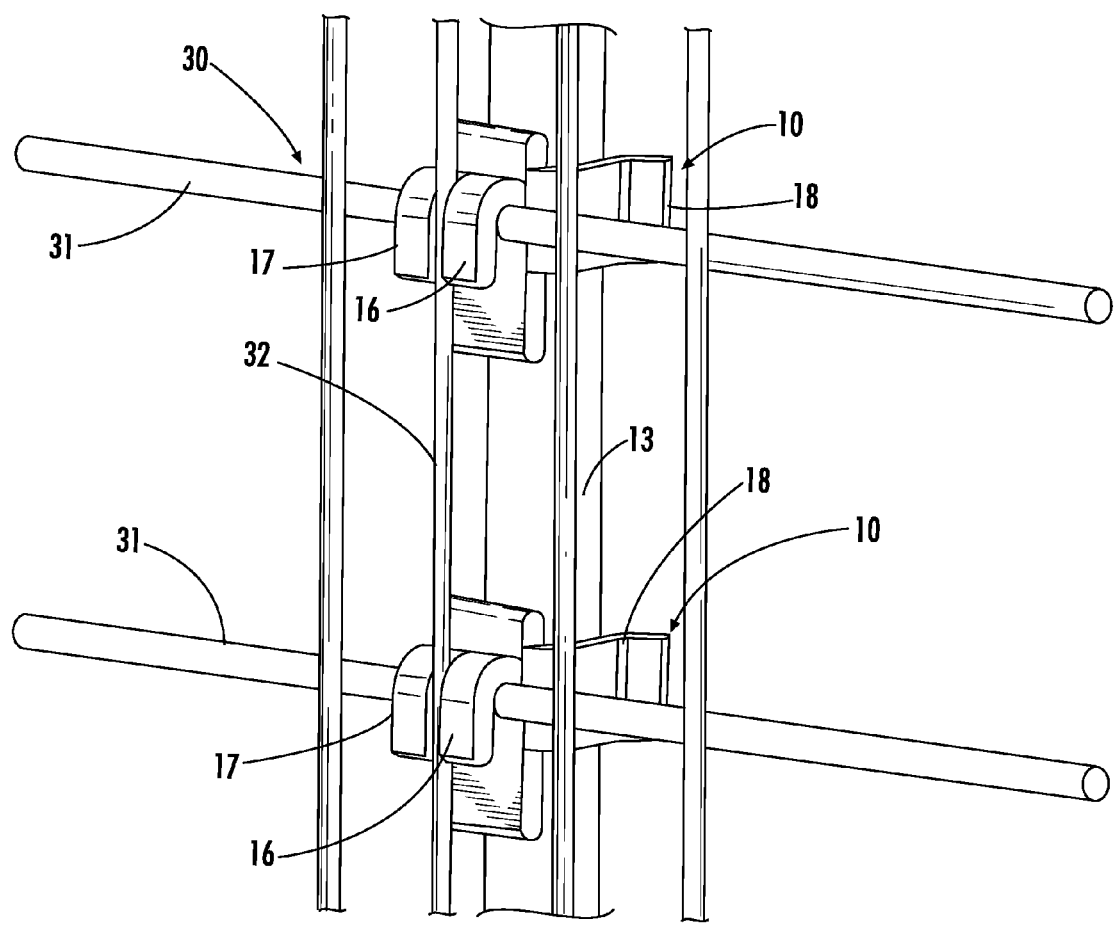
FIG. 4 shows the apparatus of FIG. 1 secured to a mesh support.

Referring now to FIG. 4, in use, the apparatus 10 is secured to the mesh support 30 using hooks 16 and 17. As shown, the hooks 16 and 17 are secured over a support member 31 of the mesh support 30 such that the rear surface 14 resides adjacent to the mesh support 30. If needed or to provide a more stable connection, the apparatus 10 is positioned such that a non-support member 32 resides in channel 15 between the hooks 16 and 17. As illustrated, two apparatuses 10 are secured to the mesh support 30. It should be appreciated that one or more apparatuses 10 may be used and adjusted to fit any mesh support.

Once the apparatus 10 is secured to the mesh support 30, device 13 is pushed into the holding space 22 of the apparatus 10 to securely hold the device. It should be appreciated that the apparatus 10 may also be secured to the device 13 prior to being secured to the mesh support 30 and then secured to the mesh support 30, as the device 13 does not interfere with the apparatus 10 being secured to the mesh support 30. In the latter instance, the apparatus 10 may be stored on the device 13 to prevent the apparatus 10 from being lost or to eliminate storing multiple apparatuses 10 separately.

The foregoing has described an apparatus for securing a user's walking assist device. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. A method of securing a walking assist device to a support having first and second support members and at least one non-support member, comprising the steps of:
   (a) providing a first apparatus comprising:
      (i) a base;
      (ii) two rigid spaced-apart hooks extending outwardly from a rear surface of the base and adapted to secure the apparatus to the first support member, the two rigid spaced-apart hooks being spaced by a channel extending therebetween and configured to receive and permit the at least one non-support member to rest therein, each of the two rigid spaced-apart hooks having:
         (A) a horizontal section extending outwardly from the rear surface of the base; and
         (B) a vertical section extending downwardly from the horizontal section parallel to the rear surface of the base, such that the horizontal section, vertical section, and rear surface of the base create a substantially U-shaped slot, the U-shaped slot being configured to receive the first support member therein and allow each of the two hooks to slide over the first support member in a non-clamping configuration such that the apparatus hangs from the support member;
      (iii) a first gripping arm extending outwardly from a first side of the base and protruding forward of a front surface of the base;
      (iv) a second gripping arm extending outwardly from a second side of the base and protruding forward of the front surface of the base, wherein the first and second gripping arms form a holding space therebetween to secure a walking assist device therein, thereby securing the walking assist device to the support member;
   (b) positioning the first apparatus on the first support member and using the hooks to secure the first apparatus thereto in a secured position, wherein when in the secured position, the at least one non-support member rests in the channel positioned between the hooks;
   (c) positioning the walking assist device between the first and second gripping arms; and
   (d) pushing the walking assist device into the holding space created between the first and second gripping arms.

2. The method according to claim 1, further including the step of providing a second apparatus having:
   (a) a base;
   (b) two rigid spaced-apart hooks extending outwardly from a rear surface of the base and adapted to secure the apparatus to the second support member, the two rigid spaced-apart hooks being spaced by a channel extending therebetween and configured to receive the at least one non-support member therein, each of the two rigid spaced-apart hooks having:
      (i) a horizontal section extending outwardly from the rear surface of the base; and
      (ii) a vertical section extending downwardly from the horizontal section parallel to the rear surface of the base, such that the horizontal section, vertical section, and rear surface of the base create a substantially U-shaped slot, the U-shaped slot being configured to receive the second support member therein and allow each of the two hooks to slide over the second support member in a non-clamping configuration such that the apparatus hangs from the second support member;
   (c) a first gripping arm extending outwardly from a first side of the base and protruding forward of a front surface of the base;
   (d) a second gripping arm extending outwardly from a second side of the base and protruding forward of the front surface of the base, wherein the first and second gripping arms form a holding space therebetween to secure a walking assist device therein.

3. The method according to claim 2, further including the step of positioning the second apparatus on the second support member at a position spaced-apart from the first apparatus and pushing the walking assist device into the holding space created between the first and second gripping arms of the second apparatus.

4. A method of securing a walking assist device to a support having a plurality of support members and non-support members, comprising the steps of:
   (a) providing a first apparatus having:
      (i) a base having a front surface and a rear surface, first and second gripping arms protruding forward of the front surface and adapted to secure the walking assist device therebetween, and first and second rigid spaced-apart hooks defining a channel therebetween extending outwardly from the rear surface of the base;
      (ii) wherein the first rigid spaced-apart hook includes a horizontal section extending outwardly from the rear surface of the base and a vertical section extending downwardly from the horizontal section parallel to the rear surface of the base to create a first slot having a constant width between the rear surface of the base and the vertical section; and (iii) wherein the second rigid spaced-apart hook includes a horizontal section extending outwardly from the rear surface of the base and a vertical section extending downwardly from the horizontal section parallel to the rear surface of the base to create a second slot having a constant width between the rear surface of the base and the vertical section, the first and second slots being configured to receive one of the plurality of support members to secure the first apparatus thereto;

(b) securing the first apparatus to the walking assist device; and (c) positioning the first apparatus and walking assist device such that a non-support member is positioned in the channel between the first and second rigid spaced-apart hooks; and (d) sliding the first and second at least two rigid spaced-apart hooks over a first one of the plurality of support members such that the first one of the plurality of support members is received in the first and second slots between the first and second rigid spaced-apart hooks and the rear surface of the base in a non-clamping configuration, thereby securing the first apparatus and a first portion of the walking assist device to the support.

5. The method according to claim 4, wherein the step of securing the first apparatus to the walking assist device further includes the steps of:

(a) positioning the walking assist device between the first and second gripping arms; and (b) pushing the walking assist device into a holding space created between the first and second gripping arms.

6. The method according to claim 4, further including the steps of:

(a) providing a second apparatus having:
  (i) a base having a front surface and a rear surface, first and second gripping arms protruding forward of the front surface and adapted to secure the walking assist device therebetween, and first and second rigid spaced-apart hooks defining a channel therebetween extending outwardly from the rear surface of the base;
  (ii) wherein the first rigid spaced-apart hook includes a horizontal section extending outwardly from the rear surface of the base and a vertical section extending downwardly from the horizontal section parallel to the rear surface of the base to create a first slot having a constant width between the rear surface of the base and the vertical section; and
  (iii) wherein the second rigid spaced-apart hook includes a horizontal section extending outwardly from the rear surface of the base and a vertical section extending downwardly from the horizontal section parallel to the rear surface of the base to create a second slot having a constant width between the rear surface of the base and the vertical section, the first and second slots being configured to receive one of the plurality of support members to secure the second apparatus thereto;

(b) securing the second apparatus to the walking assist device at a position spaced-apart from the first apparatus;

(c) positioning the second apparatus such that the non-support member is positioned in the channel between the first and second rigid spaced-apart hooks of the second apparatus, thereby substantially aligning the first and second apparatuses; and (d) sliding the first and second rigid spaced-apart hooks over a second one of the plurality of support members such that the second one of the plurality of support members is received in the first and second slots of the second apparatus between the first and second hooks of the second apparatus and the rear surface of the base in a non-clamping configuration, thereby securing the second apparatus and a second portion of the walking assist device to the support.

7. The method according to claim 6, further including the step of adjusting the position of the first and second apparatuses along a length of the walking assist device to allow the first and second apparatuses to engage respective ones of the plurality of support members.

\* \* \* \* \*